United States Patent [19]

Katsura et al.

[11] Patent Number: 5,355,925
[45] Date of Patent: Oct. 18, 1994

[54] PNEUMATIC RADIAL TIRE HAVING ASYMMETRIC BELT COVERING LAYERS

[75] Inventors: Naoyuki Katsura; Tomohiko Kogure; Zenichiro Shida; Yoshiaki Hashimura; Yusaku Miyazaki, all of Hiratsuka, Japan

[73] Assignee: The Yokohama Rubber Company, Ltd., Tokyo, Japan

[21] Appl. No.: 43,858

[22] Filed: Apr. 7, 1993

[30] Foreign Application Priority Data

Jun. 30, 1992 [JP] Japan .................. 4-173300

[51] Int. Cl.$^5$ ............................ B60C 9/30
[52] U.S. Cl. .................. 152/455; 152/531; 152/538
[58] Field of Search .......... 152/526, 455, 456, 209 A, 152/529, 531, 536, 538

[56] References Cited

U.S. PATENT DOCUMENTS

| | | | |
|---|---|---|---|
| Re. 26,713 | 11/1969 | Mirtain et al. | 152/455 |
| 3,231,000 | 1/1966 | Massoubre | 152/209 A |
| 3,677,319 | 7/1972 | Mirtain | 152/536 X |
| 3,834,439 | 9/1974 | Mirtain | 152/538 X |
| 4,173,991 | 11/1983 | Mirtain | 152/538 |
| 4,522,243 | 6/1985 | Eveque-Mourroux | 152/531 |

Primary Examiner—Geoffrey L. Knable
Attorney, Agent, or Firm—Nikaido, Marmelstein, Murray & Oram

[57] ABSTRACT

A pneumatic radial tire to be fitted on a wheel in which a position wherein a disc is joined to a rim is offset from the center of the width of the rim toward the outer surface of said wheel, characterized in that the tire comprises an asymmetric structure in which a belt layer is provided between a tread and a carcass layer, an outer circumferential portion of the belt layer being covered with at least one belt covering layer, the at least one belt covering layer being disposed so that an average position of the center(s) of the width(s) thereof from the equator of the tire is deviated toward the opposite side of the offset side of the disc, a ratio e/w of the deviating distance e to the width w of a ground contacting portion of the tread being set to 0.05–0.13.

4 Claims, 4 Drawing Sheets

PNEUMATIC RADIAL TIRE HAVING ASYMMETRIC BELT COVERING LAYERS

BACKGROUND OF THE INVENTION

The present invention relates to a pneumatic radial tire formed so as to improve the driving comfort of a vehicle without spoiling the steering stability thereof.

It has strongly been demanded that a pneumatic tire recently used has not only improved travelling performance of a vehicle including the steering stability thereof but also further improved driving comfort thereof. The driving comfort of a vehicle with respect to a tire thereof is represented by the magnitude of the vibration transmitted from a road surface to the interior of the vehicle via the tire. The vibration is transmitted to the interior of a vehicle via the tread of a tire, left and right side walls thereof, left and right beads thereof, a rim/disc and a vehicle body. Therefore, when the rigidity of a tire is reduced, a reaction force against an external force which the tire receives from a road surface becomes smaller, so that the driving comfort of the relative vehicle can be improved. However, when the rigidity of a tire is merely reduced, it is unavoidable that the steering stability of a vehicle with respect to the tire lowers, though the driving comfort thereof is improved.

As the techniques for driving front wheels (FWD) in a vehicle driving system and the techniques for expanding the inner space of a vehicle have been developed in recent years, the techniques for forming an asymmetric wheel structure so as to increase the inner side space thereof to as great an extent as possible have been advanced. A tendency to gradually increase the distance over which a position in which a disc is joined to a rim is offset from the center of the width of the rim toward the outer surface of the wheel has been seen. The inventors of the present invention have studied the transmission of vibration between a wheel of such an asymmetric structure and a tire to discover that there is very close correlation between the transmission of vibration and the construction of a wheel.

The results of an investigation on the transfer rates of vibration transmitted from both side walls of a tire to a wheel of an asymmetric structure show that a transfer rate of the vibration transmitted to the interior of a vehicle via a rim end on the offset side of the disc (outer side of the wheel) is higher than that of the vibration transmitted to the same via a rim end on the anti-offset side of the disc (inner side of the wheel), and that, moreover, a tendency toward a higher vibration transfer rate of the offset side portion of the wheel becomes more distinct in proportion to the distance over which the position in which the disc is joined to the rim is offset from the center of the width of the rim toward the outer surface of the wheel.

The inventors of the present invention have thoroughly studied such new knowledge with respect to the steering stability to discover that, when this knowledge is skillfully utilized, the above-mentioned problem of the steering stability and driving comfort which are in tradeoff relation can be solved, and that the driving comfort can be improved without spoiling the steering stability.

SUMMARY OF THE INVENTION

An object of the present invention is to provide a pneumatic radial tire formed so as to improve the driving comfort of a vehicle without spoiling the steering stability thereof.

To achieve this object, the present invention provides a pneumatic radial tire to be fitted on a wheel in which a position wherein a disc is joined to a rim is offset from the center of the width of the rim toward the outer surface of the wheel, characterized in that the tire comprises an asymmetric structure in which a belt layer is provided between a tread and a carcass layer, an outer circumferential portion of the belt layer being covered with at least one belt covering layer, the at least one belt covering layer being disposed so that an average position of the center(s) of the width(s) thereof from the equator of the tire is deviated toward the opposite side of the offset side of the disc, a ratio e/w of this deviating distance e to the width w of a ground contacting portion of the tread being set to 0.05–0.13.

Since an average position of the center(s) of the width(s) of the at least one belt covering layer is thus shifted from the equator of the tire toward the anti-offset side of the disc so that a ratio e/w of the deviating distance e to the width w of a ground contacting portion of the tread is 0.05–0.13, the vibration transfer quantity of an outer side portion of the tire to be fitted on an offset side rim end having a higher vibration transfer rate can be lowered by reducing the rigidity of this tire portion, whereby an impact force against the interior of a vehicle can be minimized. When the rigidity of an inner side portion of the tire to be fitted on an anti-offset side rim end having a lower vibration transfer rate is set equal to or not lower than that of the corresponding portion of a conventional tire, the travelling performance including the steering stability of a vehicle does not substantially lower.

To achieve the object of the present invention, the invention also provides a pneumatic radial tire to be fitted on a wheel of the above-described asymmetric structure, characterized in that a belt layer is provided between a tread and a carcass layer, an outer circumferential portion of the belt layer being covered with at least two belt covering layers, the at least two belt covering layers being formed of materials having different rigidities from each other, and disposed asymmetrically with respect to the equator of the tire, whereby the rigidity of the portion of the tire which is on the offset side of the disc may be set lower than that of the portion of the tire which is on the opposite side of the offset side of the disc.

According to the present invention, the width of each belt covering layer shall be represented by Vi, and a distance between the center of the width of each of these layers and the equator of the tire Si with Si on the anti-offset side and offset side having a positive value and a negative value respectively. A deviating distance e of an average position of the center(s) of the width(s) of the not less than one belt covering layers is then defined by a value obtained by dividing the sum of the values (Vi×Si) of all the belt covering layers by that of Vi.

The width w of a ground contacting portion of a tread referred to above is determined when a tire inflated to a JATMA standard air pressure is brought into contact with the ground with a load 80% of a JATMA maximum load.

According to the present invention, the outer side of a wheel and a tire means the side positioned at the outer side of a vehicle when the wheel and tire are attached to the vehicle, and, conversely, the inner side of a wheel and a tire the side positioned at the inner side of a vehicle when the wheel and tire are attached to the vehicle. The offset side of a disc corresponds to the outer side mentioned above, and the anti-offset side of a disc the inner side mentioned above.

DESCRIPTION OF THE PREFERRED EMBODIMENTS

Figure 1:
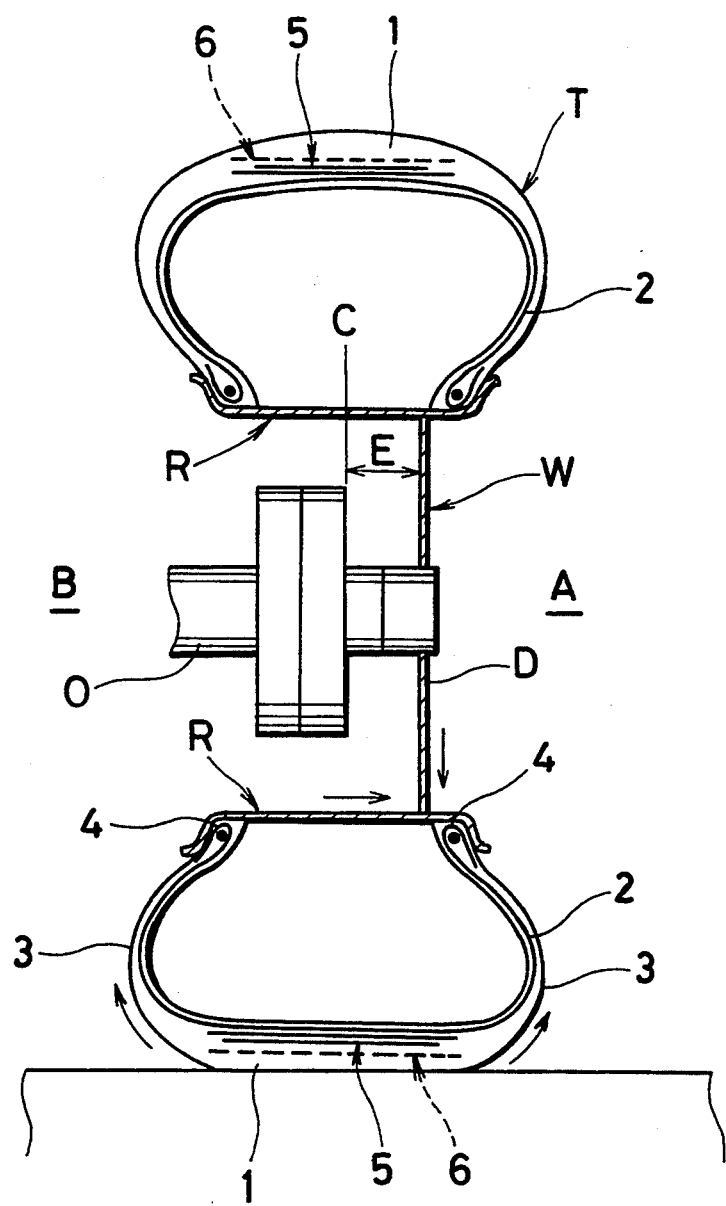
FIG. 1 is a schematic section of an embodiment of the pneumatic tire according to the present invention fitted on a wheel.

Referring to FIG. 1, a reference letter W denotes a wheel mounted on an axle O, and T a pneumatic radial tire fitted on this wheel W. The wheel W comprises a rim R and a disc D, and is formed asymmetrically with the disc D offset with respect to the rim R from the center C of the width of the rim toward the outer surface of the wheel by a distance E.

The pneumatic radial tire T comprises a tread 1, left and right side walls 3 and left and right beads 4, and these beads 4 are adapted to be fitted in the rim R of the wheel W. A carcass layer 2 is provided so as to extend between the left and right beads 4, 4, and a two-sheet belt layer 5 is inserted between the carcass layer 2 and tread 1. This belt layer 5 comprises high-rigidity cords, such as aramid cords and steel cords, and the component sheets of the belt layer are laminated so that the cords in one sheet cross those in the other at about 10°–30° with respect to the circumferential direction of the tire. A thin belt covering layer 6 is laid on the outer circumferential side of this belt layer 5. The belt covering layer 6 comprises cord materials, such as nylon cords and aramid cords which extend at substantially zero degree, and preferably at 0°–10° with respect to the circumferential direction of the tire. The belt covering layer 6 may comprise only one layer as shown in FIG. 1, or a plurality of layers, or edge covers for hiding the edge portions only of the belt layer 5. The pneumatic radial tire T is fitted at the outer side portion thereof on a rim end at the offset side A of the wheel W, and at the inner side portion thereof on a rim end at the anti-offset side B of the wheel W.

Figure 2:
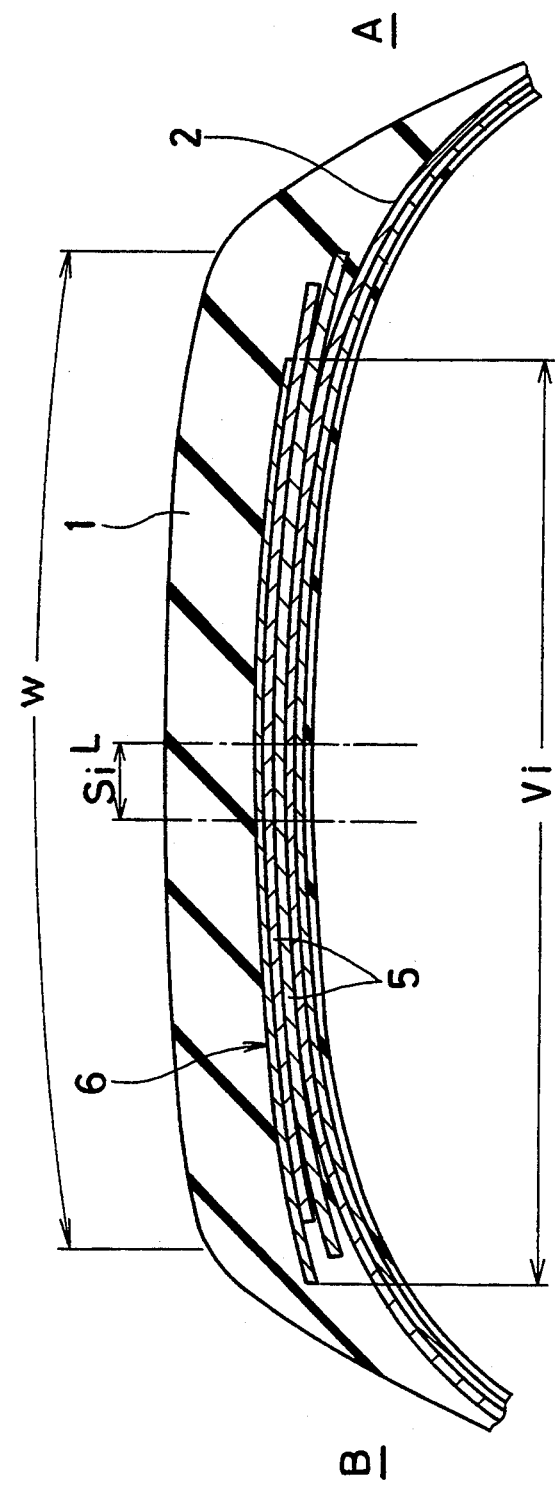
FIG. 2 is a schematic section showing a principal portion of an embodiment of the present invention.

FIG. 2 is a partial enlarged section showing a principal portion of the tire of FIG. 1. Not less than one belt covering layer 6 is provided so that the belt covering layer 6 as a whole is shifted toward the anti-offset side B with an average position of the center(s) (distant by Si) of the width(s) thereof deviating from the equator L of the tire toward the mentioned side B. When only one belt covering layer 6 is provided, the distance Si between the center of the width thereof and the equator L of the tire corresponds to a deviating distance e. When a plurality of belt covering layer 6 are provided, a deviating distance e is determined on the basis of an average position which is calculated in accordance with the following numerical formula (1) and on the basis of the widths Vi of the belt covering layers 6 and the distances Si between the centers of the widths thereof and the equator L of the tire, and a ratio e/w of the deviating distance e to the width w of a ground contacting portion of the tread is set to 0.05–0.13 and preferably to 0.07–0.10. The distance Si shall have a positive value at the anti-offset side B, and a negative value at the offset side A.

$$e = \frac{1}{\sum_i V_i} \times \sum_i (V_i \times S_i) \tag{1}$$

When the ratio e/w is set as mentioned above, it becomes possible to lower the vibration transfer quantity of the outer side portion of the tire, which is to be fitted on a rim end on the offset side A having a higher vibration transfer rate, by reducing the rigidity thereof relatively to that of the inner side portion of the tire, and minimize an impact force imparted to the interior of a vehicle, whereby the driving comfort of the vehicle can be improved.

When the rigidity of the inner side portion of the tire to be fitted on a rim end on the anti-offset side B having a lower vibration transfer rate is set equal to or not lower than that of the corresponding side portion of a conventional tire, the travelling performance of the vehicle including the steering stability thereof does not substantially lower.

When in this embodiment the ratio e/w of the deviating distance e to the width w of a ground contacting portion of the tread is less than 0.05, the asymmetric structure becomes imperfect and the driving comfort improving effect is not obtained, and, conversely, when this ratio exceeds 0.13, the asymmetric structure becomes excessive and the steering stability of a vehicle decreases, though the driving comfort thereof is improved.

According to the present invention, the material and construction of the belt layer 5 are not limited to what are referred to above. The belt structures, such as a stepped belt structure and a folded belt structure may be employed as long as they are used for regular radial tires. The material for the belt covering layer 6 is not limited to the above-mentioned materials, either, and any materials used for regular radial tires may be employed.

The above-described tire of an asymmetric structure according to the present invention displays its object operational effect when it is combined with a wheel of an asymmetric structure. Therefore, it is desirable that the outer surface of a side wall of a tire carries words indicating the side portion of the tire which is to be fitted on the outer side portion of a rim (outer side portion of a wheel), and an offset distance of a rim of a suitable wheel. For example, "FACE THIS SIDE OUTWARD WHEN FITTED ON SUITABLE WHEEL HAVING OFFSET DISTANCE OF RIM OF 30–40 mm". The size and shape of the letters may be arbitrarily determined. When embossed letters are used, they should project outward from the surface of a tire by about 0.3–6 mm, and, when recessed letters and used, they are marked on the surface of a tire to the depth of about 0.3–1 mm. A rubber sheet which has such letters transferred thereto, and which is pasted on a green tire may be combined therewith during the vulcanization of the green tire. In order that such letters become more noticeable, embossed or recessed letters can be shown on a platform provided on the surface of a tire so as to project therefrom by around 1-3 mm.

According to the present invention described above, an improved pneumatic radial tire to be fitted on a wheel of an asymmetric structure is provided, in which a belt covering layer is disposed so that an average position in which the center of the width thereof deviates from the equator of the tire is shifted toward the opposite side of the offset side of a disc, a ratio e/w of this deviating distance e to the width w of a ground contacting portion of a tread being set to 0.05-0.13. Therefore, it becomes possible to lower the vibration transfer quantity of an outer side portion of the tire to be fitted on an offset side rim end having a higher vibration transfer rate by reducing the rigidity of the tire portion, and minimize an impact force against the interior of a vehicle, so that the driving comfort of the vehicle can be improved. When the rigidity of an inner side portion of the tire to be fitted on an anti-offset side rim end having a lower vibration transfer rate is set equal to or not lower than that of the corresponding portion of a conventional tire, the travelling performance including the steering stability of a vehicle does not substantially lower.

EXAMPLE

Eight types of pneumatic radial tires having a tire size of 175/70R13 and a tire structure of FIG. 1, in each of which a two-sheet belt layer comprising steel cords, and a belt covering layer comprising fifty-five (end count) 840 d/2 nylon cords/50 mm were provided, were manufactured with the structures of the belt covering layers only thereof varied as follows.

Conventional Tire 1

Figure 3A:
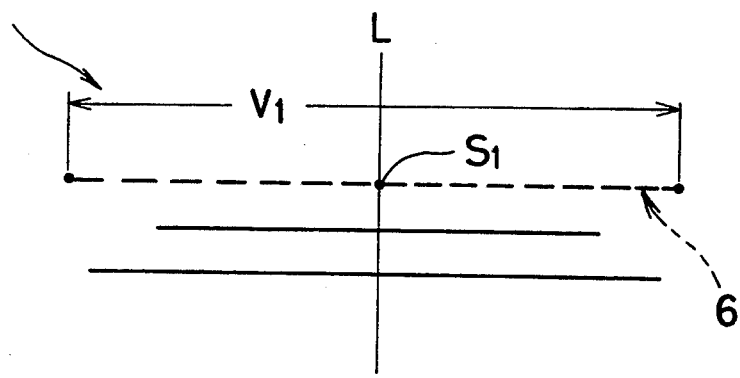
FIGS. 3(a), 3(b) and 3(c) are schematic sections of belt covering structures (whole-width belt covering layers only) in test tires.

Structure of the belt covering layer: FIG. 3(a)
Size of the belt covering layer: $V_1 = 120$ mm
Distance between the equator L of the tire and the center of the width of the belt covering layer: $S_1 = 0$ mm Comparative Tire 1

Figure 3B:
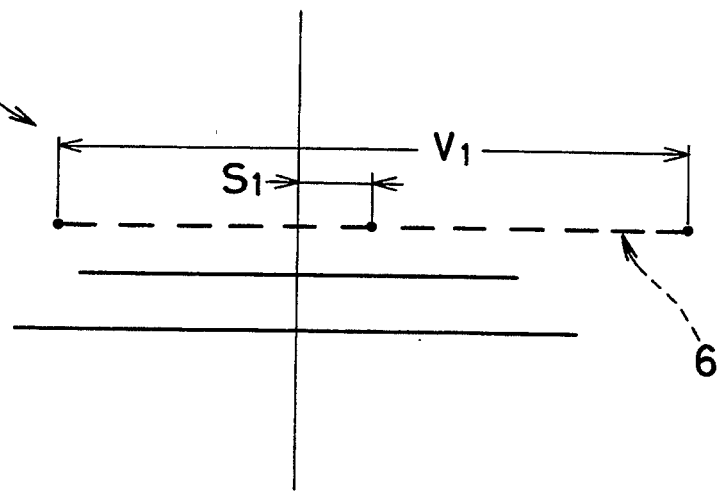

Structure of the belt covering layer: FIG. 3(b)
Size of the belt covering layer: $V_1 = 120$ mm
Distance between the equator L of the tire and the center of the width of the belt covering layer: $S_1 = -10$ mm Comparative Tire 2

Figure 3C:
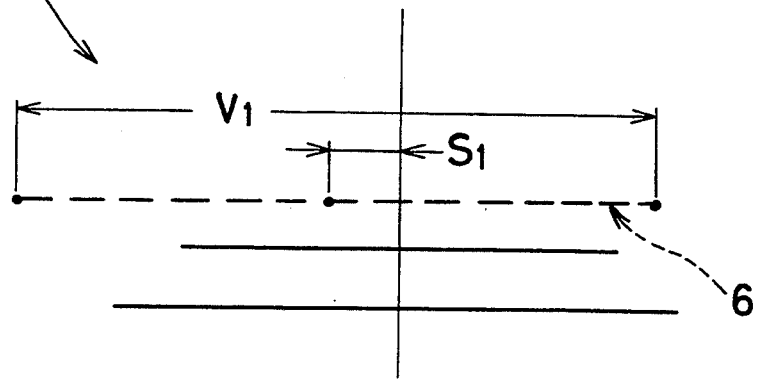

Structure of the belt covering layer: FIG. 3(c)
Size of the belt covering layer: $V_1 = 120$ mm
Distance between the equator L of the tire and the center of the width of the belt covering layer: $S_1 = 4$ mm Tire 1 According to the Present Invention Structure of the belt covering layer: FIG. 3(c)
Size of the belt covering layer: $V_1 = 120$ mm
Distance between the equator L of the tire and the center of the width of the belt covering layer: $S_1 = 6$ mm Tire 2 According to the Present Invention Structure of the belt covering layer: FIG. 3(c)
Size of the belt covering layer: $V_1 = 120$ mm
Distance between the equator L of the tire and the center of the width of the belt covering layer: $S_1 = 15$ mm Comparative Tire 3

Structure of the belt covering layer: FIG. 3(c)
Size of the belt covering layer: $V_1 = 120$ mm
Distance between the equator L of the tire and the center of the width of the belt covering layer: $S_1 = 17$ mm Conventional Tire 2

Figure 4A:
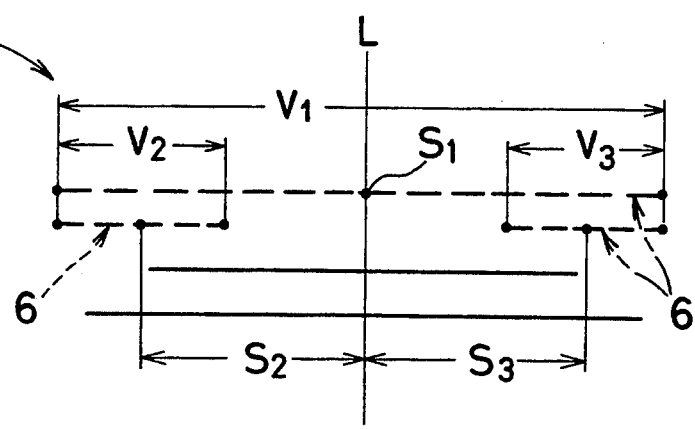
FIGS. 4(a) and 4(b) are schematic sections of belt structures (whole-width belt covering layers and edge covering layers) in test tires.
Figure 4B:
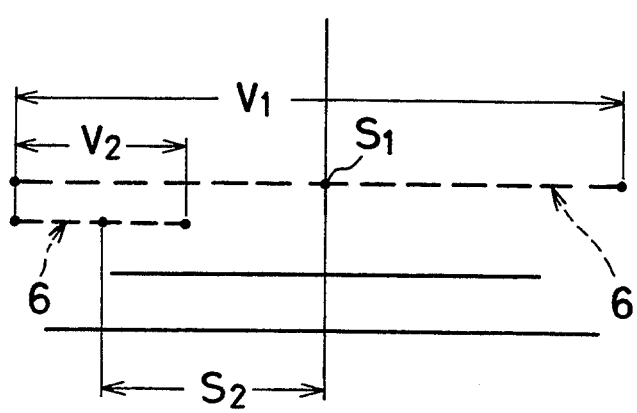

Structure of the belt covering layers: FIG. 4(a)
Sizes of the belt covering layers: $V_1 = 120$ mm, $V_2 = 30$ mm, $V_3 = 30$ mm
Distance between the equator L of the tire and the center of the widths of the belt covering layers: $S_1 = 0$ mm, $S_2 = 45$ mm, $S_3 = -45$ mm Tire 3 According to the Present Invention Structure of the belt covering layers: FIG. 4(b)
Sizes of the belt covering layers: $V_1 = 120$ mm, $V_2 = 30$ mm
Distances between the equator L of the tire and the centers of the widths of the belt covering layers: $S_1 = 0$ mm, $S_2 = 45$ mm These eight types of tires were fitted on the rims of asymmetric wheels (size of the rim: 13×5-J, offset distance of the rim: 35 mm), and the steering stability and driving comfort with respect thereto were evaluated by the following methods with the air pressure in the tires and a load set to 2.0 kgf/cm² and 300 kgf respectively. The results of the evaluation and the ratio e/w of the deviating distance e of average position of the center of the width of the belt covering layer to the width w of a ground contacting portion of each tire were shown in Table 1. The width w of the ground contacting portion of the tread of each tire to be tested was 118 mm.

Steering Stability Test

Each tire to be tested was attached to a test vehcile, which was then made run on a test slalom on which pylons were set up at regular intervals, and the steering stability with respect to an average speed of the vehicle was evaluated. The results of the evaluation were shown by indexes based on a reference index (100) which represented the steering stability concerning the conventional tire 1. The large indexes represent superior steering stability.

Driving Comfort Test

A travelling test for each tire was conducted on a drum of 1707 mm in diameter provided with a 5 mm projection, at a vehicle speed of 50 km/h, and a difference between a maximum value and a minimum value of a longitudinal impact force (kgf) occurring during the test was measured. The results of the evaluation are shown by indexes based on a reference index (100) which represents the driving comfort concerning the conventional tire. A smaller index represents a smaller impact force occurring when the tire runs over the projection, and superior driving comfort.

TABLE 1

|  | e (mm) | e/w | Driving comfort | Steering stability |
|---|---|---|---|---|
| Conventional tire 1 | 0 | 0 | 100 | 100 |
| Comparative tire 1 | −10 | −0.085 | 103 | 100 |
| Comparative tire 2 | 4 | 0.034 | 100 | 100 |

TABLE 1-continued

|  | e (mm) | e/w | Driving comfort | Steering stability |
|---|---|---|---|---|
| Tire 1 according to the present invention | 6 | 0.051 | 97 | 100 |
| Tire 2 according to the present invention | 15 | 0.127 | 94 | 100 |
| Comparative tire 3 | 17 | 0.144 | 92 | 95 |
| Conventional tire 2 | 0 | 0 | 107 | 102 |
| Tire 3 according to the present invention | 9 | 0.076 | 103 | 102 |

As is clear from Table 1, the steering stability concerning the tires 1 and 2 according to the present invention was maintained at the same level as that concerning the conventional tire 1, in which the structure of the belt covering layer was substantially identical with those of the belt covering layers in the tires 1 and 2 according to the present invention, and, moreover, the driving comfort concerning the tires 1 and 2 according to the present invention was improved as compared with that concerning this conventional tire 1. Since the construction of the comparative tire 1 was contrary to that of the tires according to the present invention, the driving comfort concerning the same lowered. Since the asymmetric structure of the comparative tire 2, in which e/w=0.034, was imperfect, the steering stability and driving comfort concerning this tire were equal to those concerning the conventional tire 1. Since the asymmetric structure of the comparative tire 3, in which e/w=0.144, was excessive, the driving comfort was improved as compared with that concerning the conventional tire 1 but the steering stability lowered greatly.

In the tire 3 according to the present invention to which an edge cover was added, the steering stability was maintained at the same level as that of the conventional tire 2 having substantially the same structure of belt covering layers, and, moreover, the driving comfort was improved.

Five types of pneumatic radial tires having a tire size of 175/70R13 and a tire structure of FIG. 1, in each of which a two-sheet belt layer comprising steel cords, and belt covering layers of FIG. 4a were provided, were manufactured with only the materials for these belt covering layers and the end count of cords per width of 50 mm in these belt covering layers varied as follows.

Conventional Tire 3

Whole-width belt covering layer:
 Material: 840 d/2 nylon cords
 End count of cords used: 55/50 mm
Offset side edge cover:
 Material: 840 d/2 nylon cords
 End count of cords used: 55/50 mm
Anti-offset side edge cover:
 Material: 840 d/2 nylon cords
 End count of cords used: 55/50 mm Comparative Tire 4

Whole-width belt covering layer:
 Material: 840 d/2 nylon cords
 End count of cords used: 55/50 mm
Offset side edge cover:
 Material: 840 d/2 nylon cords
 End count of cords used: 50/50 mm
Anti-offset side edge cover:
 Material: 840 d/2 nylon cords
 End count of cords used: 55/50 mm Tire 4 According to the Present Invention Whole-width belt covering layer:
 Material: 840 d/2 nylon cords
 End count of cords used: 55/50 mm
Offset side edge cover:
 Material: 840 d/2 nylon cords
 End count of cords used: 45/50 mm
Anti-offset side edge cover:
 Material: 840 d/2 nylon cords
 End count of cords used: 55/50 mm Tire 5 According to the Present Invention Whole-width belt covering layer:
 Material: 840 d/2 nylon cords
 End count of cords used: 55/50 mm
Offset side edge cover:
 Material: 840 d/2 nylon cords
 End count of cords used: 55/50 mm
Anti-offset side edge cover:
 Material: 1000 d/2 aramid cords
 End count of cords used: 50/50 mm Tire 6 According to the Present Invention Whole-width belt covering layer:
 Material: 840 d/2 nylon cords
 End count of cords used: 55/50 mm
Offset side edge cover:
 Material: 420 d/2 nylon cords
 End count of cords used: 55/50 mm
Anti-offset side edge cover:
 Material: 840 d/2 nylon cords
 End count of cords used: 55/50 mm These five types of tires were fitted on rims of asymmetric wheels (size of the rims: 13×5-J, offset distance of the rims: 35 mm), and the steering stability and driving comfort concerning the tires were evaluated by the same test method as mentioned above, with the air pressure in the tires and a load set to 2.0 kgf/cm² and 300 kg respectively. The results are shown in Table 2. The width w of a ground contacting portion of a tread of each of the tires to be tested was 118 mm.

TABLE 2

|  | Riding comfort | Steering stability |
|---|---|---|
| Conventional tire 3 | 107 | 102 |
| Comparative tire 4 | 107 | 102 |
| Tire 4 according to the present invention | 104 | 102 |
| Tire 5 according to the present invention | 107 | 105 |
| Tire 6 according to the present invention | 105 | 102 |

As is clear from Table 2, the steering stability of a vehicle concerning the tire 4 according to the present invention, in which the end count of the cords provided in a portion, which hides the offset side belt edge portion, of the belt covering layer was set smaller than that of the cords provided in a portion, which hides the anti-offset side belt edge portion, of the belt covering layer, was maintained at the same level as that concerning the conventional tire 3, and, moreover, the driving comfort concerning the former tire was improved. In the tire 5 according to the present invention, an anti-offset side portion of the belt covering layer is formed with aramid cords of a high elastic modulus. Therefore, the driving comfort concerning this tire was maintained at the same level as that concerning the conventional tire 3, and, moreover, the steering stability concerning the former tire was improved.

In the tire 6 according to the present invention, cords constituting belt covering layer on the offset side is smaller than that on the anti-offset side. Therefore, the steering stability concerning this tire was maintained at the same level as that concerning the conventional tire 3, and, moreover, the driving comfort concerning the former was improved. On the other hand, the steering stability and driving comfort concerning the comparative tire 4 were substantially identical with those concerning the conventional tire 3 since a difference between the number of the cords provided in an offset side portion of the belt covering layer in the former tire and that of the same cords provided in an anti-offset side portion thereof was small.

When the outer circumferential portion of a belt layer is thus covered with not less than two belt covering layers, the different belt covering layers are formed out of materials of different rigidities, and these belt covering layers are arranged asymmetrically with respect to the equator of the tire with the rigidity of the offset side portions of these belt layers set lower than that of the anti-offset portions thereof. It has been discovered that, when the belt covering layers are provided in this manner, the balance of the steering stability and driving comfort of a vehicle concerning the tires is improved.

What is claimed is:

1. A pneumatic radial tire to be fitted on a wheel, the wheel having a rim, and a disc joined to the rim at a position offset from the center of the width of the rim toward the outer surface of said wheel, said tire comprising a belt layer provided between a tread and a carcass layer at a cord angle of 10°-30° to the tire circumferential direction, an outer circumferential portion of said belt layer being covered with at least two belt covering layers, said at least two belt covering layers being formed of materials having different rigidities from each other and having a cord angle of 0°-10° to the tire circumferential direction, said at least two belt covering layers being disposed asymmetrically with respect to the equator of said tire, such that the rigidity of the portion of said tire to one side of the equator of the tire to be mounted on the offset side of said disc of the wheel is lower than that of the portion of said tire which is on the opposite side of the equator.

2. A pneumatic radial tire according to claim 1, wherein an outer surface of a side wall of the tire on said one side shows a direction in which said side wall is to face when said tire is fitted on a wheel.

3. A pneumatic radial tire according to claim 1, wherein an outer surface of a side wall of the tire on said one side shows an offset distance of a disc of a suitable wheel.

4. A wheel structure comprising combination of a wheel having a rim and a disc joined to said rim at a position offset from a center of the width of the rim toward one side of the wheel; and a pneumatic radial tire, said tire comprising a belt layer provided between a tread and a carcass layer at a cord angle of 10°-30° to the tire circumferential direction, an outer circumferential portion of said belt layer being covered with at least two belt covering layers, said at least two belt covering layers being formed of materials having different rigidities from each other and having a cord angle of 0°-10° to the tire circumferential direction, said at least two belt covering layers being disposed asymmetrically with respect to the equator of said tire, such that the rigidity of the portion of said tire to one side of the equator of the tire mounted on the offset side of said disc of the wheel is lower than that of the portion of said tire which is on the opposite side of the equator.

* * * * *